United States Patent
Ohnishi et al.

(10) Patent No.: US 12,332,627 B2
(45) Date of Patent: Jun. 17, 2025

(54) FUSION SPLICING APPARATUS MANAGEMENT SYSTEM AND FUSION SPLICING APPARATUS MANAGEMENT METHOD

(71) Applicant: SEI OPTIFRONTIER CO., LTD., Yokohama (JP)

(72) Inventors: Takaharu Ohnishi, Yokohama (JP); Kazuyoshi Ooki, Yokohama (JP); Hideaki Yusa, Yokohama (JP)

(73) Assignee: SEI OPTIFRONTIER CO., LTD., Yokohama (JP)

( * ) Notice: Subject to any disclaimer, the term of this patent is extended or adjusted under 35 U.S.C. 154(b) by 1322 days.

(21) Appl. No.: 16/771,729

(22) PCT Filed: Dec. 12, 2018

(86) PCT No.: PCT/JP2018/045706
§ 371 (c)(1),
(2) Date: Jun. 11, 2020

(87) PCT Pub. No.: WO2019/117203
PCT Pub. Date: Jun. 20, 2019

(65) Prior Publication Data
US 2020/0371492 A1    Nov. 26, 2020

(30) Foreign Application Priority Data
Dec. 15, 2017  (JP) .................................. 2017-240514

(51) Int. Cl.
*G05B 19/406*    (2006.01)
*G02B 6/255*    (2006.01)
*G06F 16/245*    (2019.01)

(52) U.S. Cl.
CPC ......... *G05B 19/406* (2013.01); *G02B 6/2553* (2013.01); *G06F 16/245* (2019.01); *G05B 2219/32226* (2013.01)

(58) Field of Classification Search
CPC ........ G05B 19/406; G05B 2219/32226; G02B 6/2553; G06F 16/245; G06Q 10/20; G06Q 10/087; G06Q 30/01–016; G06Q 30/0645
See application file for complete search history.

(56) References Cited

U.S. PATENT DOCUMENTS

| 6,206,583 B1 * | 3/2001 | Hishikawa ........... G02B 6/2551 385/96 |
| 2005/0078921 A1 * | 4/2005 | Huang ................. G02B 6/2551 385/95 |

(Continued)

FOREIGN PATENT DOCUMENTS

| CN | 1117286 C | 8/2003 |
| CN | 107330523 A | 11/2017 |

(Continued)

OTHER PUBLICATIONS

Mar. 5, 2019 International Search Report issued in International Patent Application No. PCT/JP2018/045706.

*Primary Examiner* — Shelby A Turner
*Assistant Examiner* — Yaritza H Perez Bermudez
(74) *Attorney, Agent, or Firm* — Oliff PLC (57) ABSTRACT

A management system of a fusion splicer for selecting an appropriate maintenance base when the fusion splicer malfunctions. The management system includes a determination unit configured to determine a type of a failure mode of the fusion splicer, an acquisition unit configured to acquire position information of the fusion splicer, and a selection unit configured to select an appropriate maintenance base on the basis of the type of the failure mode determined by the (Continued)

determination unit and the position information of the fusion splicer acquired by the acquisition unit.

18 Claims, 9 Drawing Sheets

(56) References Cited

U.S. PATENT DOCUMENTS

| | | | |
|---|---|---|---|
| 2005/0238298 A1 | 10/2005 | Roark et al. | |
| 2009/0080842 A1* | 3/2009 | Kossat | G02B 6/2551 |
| | | | 385/134 |
| 2009/0232458 A1* | 9/2009 | Hess | G02B 6/2553 |
| | | | 385/95 |
| 2010/0065535 A1* | 3/2010 | Zheng | G02B 6/2552 |
| | | | 219/121.52 |
| 2013/0284377 A1 | 10/2013 | Takayanagi et al. | |
| 2015/0205045 A1* | 7/2015 | Park | G02B 6/2553 |
| | | | 65/485 |
| 2016/0116675 A1 | 4/2016 | Sasaki | |
| 2018/0275345 A1* | 9/2018 | Kawanishi | G02B 6/566 |
| 2020/0134997 A1* | 4/2020 | Ooki | G08B 13/22 |
| 2020/0341197 A1* | 10/2020 | Suzuki | H04L 67/12 |
| 2022/0078534 A1* | 3/2022 | Suzuki | H04Q 11/0003 |
| 2023/0177616 A1* | 6/2023 | Thurber | G06Q 50/163 |
| | | | 705/4 |

FOREIGN PATENT DOCUMENTS

| | | | | | |
|---|---|---|---|---|---|
| JP | 2002-132992 | A | | 5/2002 | |
| JP | 2002-329098 | A | | 11/2002 | |
| JP | 2003-287643 | A | | 10/2003 | |
| JP | 2012-141357 | A | | 7/2012 | |
| JP | 2013-069239 | A | | 4/2013 | |
| JP | 2015-099471 | A | | 5/2015 | |
| JP | 2016-085321 | A | | 5/2016 | |
| JP | 2016136178 | A | * | 7/2016 | ......... G02B 21/0016 |
| JP | 2017054288 | A | * | 3/2017 | |

\* cited by examiner

| FAILURE INFORMATION DATABASE | VALUE |
|---|---|
| POSITION INFORMATION(GPS) | (XX,YY) |
| OUT-OF-ORDER MODEL | T-72C |
| FAILURE MODE | FAILURE OF MICROSCOPE |
| DESIRED SERVICE | RENTAL |
| DESIRED HANDLING DATE | 2017/10/20 |

Fig. 8

| MAINTENANCE BASE | POSITION INFORMATION (GPS) | MODEL CAPABLE OF BEING SUPPORTED | FAILURE MODE CAPABLE OF BEING SUPPORTED | RENTAL DEVICE | HANDLING DATE |
|---|---|---|---|---|---|
| MAINTENANCE BASE 1 | (xx1,yy1) | T-72C | MICROSCOPE FAILURE | YES | 2017/10/20 |
| MAINTENANCE BASE 2 | (xx2,yy2) | T-71C+ T-72C | MICROSCOPE FAILURE, HEATER FAILURE | NO | 2017/11/20 |
| MAINTENANCE BASE 3 | (xx3,yy3) | T-71C T-71M T-72C | ELECTRODE MOUNT FAILURE | YES | 2017/12/15 |
| MAINTENANCE BASE 4 | (xx4,yy4) | TYPE-201e | STAGE FAILURE | NO | 2018/12/3 |
| MAINTENANCE BASE 5 | (xx5,yy5) | TYPE-201e | ... | YES | 2017/12/23 |

FUSION SPLICING APPARATUS MANAGEMENT SYSTEM AND FUSION SPLICING APPARATUS MANAGEMENT METHOD

TECHNICAL FIELD

The present disclosure relates to a management system of a fusion splicer and a management method of a fusion splicer. The present application is based upon and claims the benefit of the priority from Japanese Patent Application No. 2017-240514, filed on Dec. 15, 2017, the entire contents of which are incorporated herein by reference.

BACKGROUND ART

Patent Literature 1 discloses a fusion splicer that fuses and splices optical fibers to each other. The fusion splicer is provided with V-grooves in which optical fibers are placed, an arc-discharging electrode and an electrode mount that fuse the optical fibers, a microscope or a monitor that monitors a fusion splicing state between the optical fibers, and a heater that heats and shrinks a reinforcement sleeve with which a connection portion between the fused optical fibers is covered.

CITATION LIST

Patent Literature

[Patent Literature 1] Japanese Unexamined Patent Publication No. 2012-141357

SUMMARY OF INVENTION

The present disclosure provides a management system of a fusion splicer for selecting an appropriate maintenance base when the fusion splicer malfunctions. The management system includes a determination unit, an acquisition unit, and a selection unit. The determination unit determines a type of a failure mode of the fusion splicer. The acquisition unit acquires position information of the fusion splicer. The selection unit selects an appropriate maintenance base on the basis of the type of the failure mode determined by the determination unit and the position information of the fusion splicer acquired by the acquisition unit.

The present disclosure also provides a management method of a fusion splicer for selecting an appropriate maintenance base when the fusion splicer malfunctions. The management method includes determining a type of a failure mode of the fusion splicer, acquiring position information of the fusion splicer, and selecting an appropriate maintenance base on the basis of the determined type of the failure mode and the acquired position information of the fusion splicer.

DESCRIPTION OF EMBODIMENTS

Problems to be Solved by the Present Disclosure

A fusion splicer includes precision instruments such as V-grooves, a discharge electrode, a microscope, a monitor, and a heater and some thereof may malfunction during use thereof. On the other hand, with an increase in the number of types of optical fibers, the number of types of fusion splicers is increasing and maintenance bases that can handle failures may differ depending on the types of fusion splicers. This is because, since instruments constituting a fusion splicer are precision instruments, advanced skills are required for repair of a failure and only a maintenance base with repair skills for a certain failure mode of a certain model and with an inventory of necessary maintenance components can serve as a maintenance base for the failure. Accordingly, when a certain fusion splicer is out of order, it takes much labor to ascertain what maintenance base can repair the fusion splicer out of a plurality of maintenance bases.

Advantageous Effects of the Present Disclosure

According to the present disclosure, it is possible to easily retrieve a maintenance base that can repair an out-of-order fusion splicer.

Description of Embodiments of the Present Disclosure

First, details of embodiments of the present disclosure will be described below. An aspect of the present disclosure provides a management system of a fusion splicer for selecting an appropriate maintenance base when the fusion splicer malfunctions. The management system includes a determination unit that determines a type of a failure mode of the fusion splicer, an acquisition unit that acquires position information of the fusion splicer, and a selection unit that selects an appropriate maintenance base on the basis of the type of the failure mode determined by the determination unit and the position information of the fusion splicer acquired by the acquisition unit.

Another aspect of the present disclosure provides a management method of a fusion splicer for selecting an appropriate maintenance base when the fusion splicer malfunctions. The management method includes determining a type of a failure mode of the fusion splicer, acquiring position information of the fusion splicer, and selecting an appropriate maintenance base on the basis of the determined type of the failure mode and the acquired position information of the fusion splicer.

In the management system and the management method of a fusion splicer, a type of a failure mode of a fusion splicer is determined, and position information of the fusion splicer is acquired. Then, an appropriate maintenance base is selected on the basis of the type of the failure mode and the position information of the fusion splicer. In this case, with the management system or the management method, since a maintenance base which can handle the failure mode occurring in the fusion splicer and which is close thereto can be selected, it is possible to easily retrieve a maintenance base that can repair the out-of-order fusion splicer.

As one embodiment, the management system of a fusion splicer may further include a base database that includes data of position information of a plurality of maintenance bases and types of failure modes which are able to be repaired by the respective maintenance bases. The selection unit may select the appropriate maintenance base by comparing the acquired type of the failure mode and the acquired position information of the fusion splicer with the base database. In the management method of the fusion splicer, the selecting of the appropriate maintenance base may include selecting the appropriate maintenance base by comparing the acquired type of the failure mode and the acquired position information of the fusion splicer with a base database that includes data of position information of a plurality of maintenance bases and failure modes which are able to be repaired by the respective maintenance bases. In these cases, since an appropriate maintenance base is selected using a base database in which necessary base information is stored in advance, it is possible to retrieve a maintenance base that can repair the out-of-order fusion splicer more easily and earlier.

As one embodiment, the management system of a fusion splicer may further include a notification unit that notifies the selection unit of model information of the fusion splicer. The selection unit may select the appropriate maintenance base on the basis also of the model information. In the management method of a fusion splicer, the selecting of the appropriate maintenance base may include selecting the appropriate maintenance base on the basis also of model information of the fusion splicer. In these cases, since model information is additionally used for a process of selecting an appropriate maintenance base, it is possible to more easily retrieve a maintenance base that can repair the out-of-order fusion splicer.

As one embodiment, in the management system of a fusion splicer, a notification unit may notify the selection unit of information on whether rental of another fusion splicer corresponding to the fusion splicer is desired and a desired delivery time of a repaired failed fusion splicer. The selection unit may select the appropriate maintenance base on the basis also of the information on whether rental is desired and the desired delivery time. In the management method of a fusion splicer, the selecting of the appropriate maintenance base may include selecting the appropriate maintenance base on the basis also of information on whether rental of another fusion splicer corresponding to the fusion splicer is desired and a desired delivery time of a repaired failed fusion splicer. In these cases, since the information on whether rental of a fusion splicer is desired and the desired delivery time of a failure repair is additionally used for the process of selecting an appropriate maintenance base, it is possible to easily retrieve an appropriate maintenance base that can repair the out-of-order fusion splicer.

As one embodiment, in the management system and the management method of a fusion splicer, the type of the failure mode of the fusion splicer may include at least one piece of information of a failure of a microscope of the fusion splicer, a failure of an electrode mount of the fusion splicer, a failure of a stage of the fusion splicer, a failure of a heater of the fusion splicer, and a failure of a V-groove for positioning an optical fiber in the fusion splicer. In this case, it is possible to easily retrieve an appropriate maintenance base that can repair the out-of-order fusion splicer.

Details of Embodiments of the Present Disclosure

A management system of a fusion splicer and a management method of a fusion splicer according to an embodiment of the present disclosure will be described below with reference to the accompanying drawings. The present invention is not limited to such description and is intended to include all modifications within the meanings and scope equivalent to the scope of the appended claims. In the following description with reference to the drawings, the same elements are referred to by the same reference signs and description thereof is not repeated.

Figure 1:
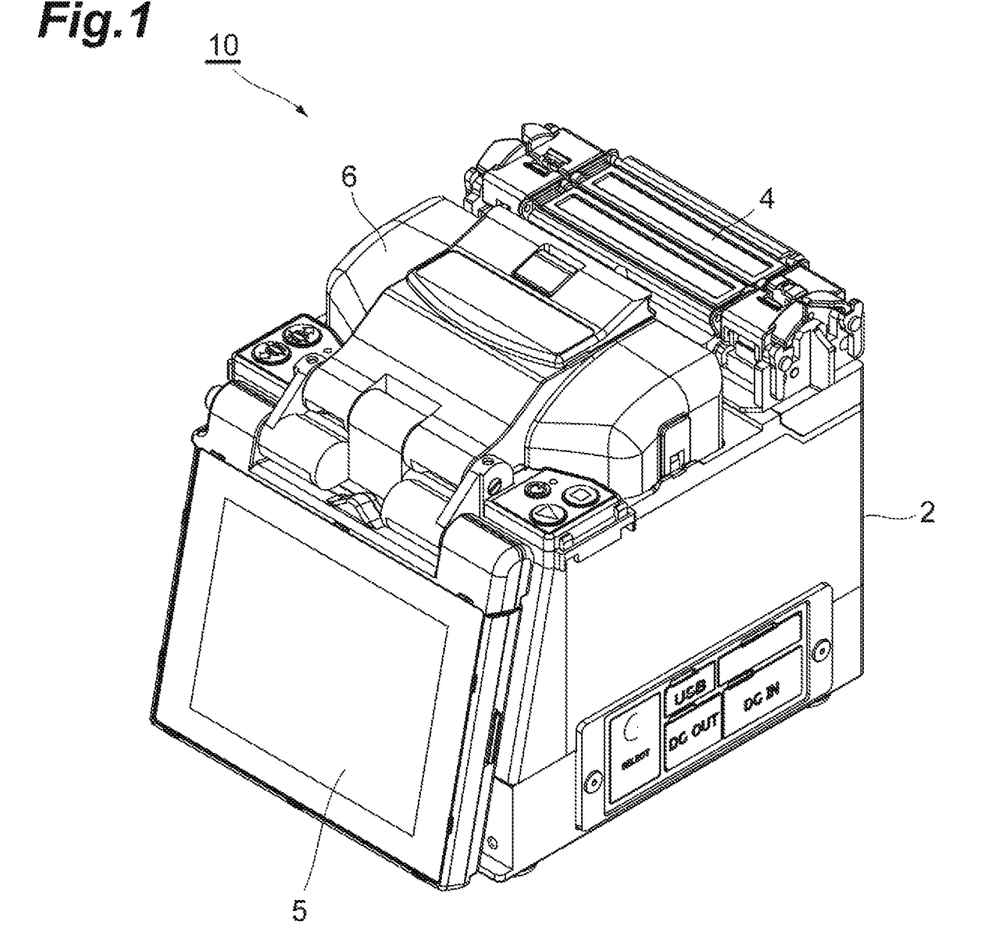
FIG. 1 is a perspective view illustrating an example of a fusion splicer.
Figure 2:
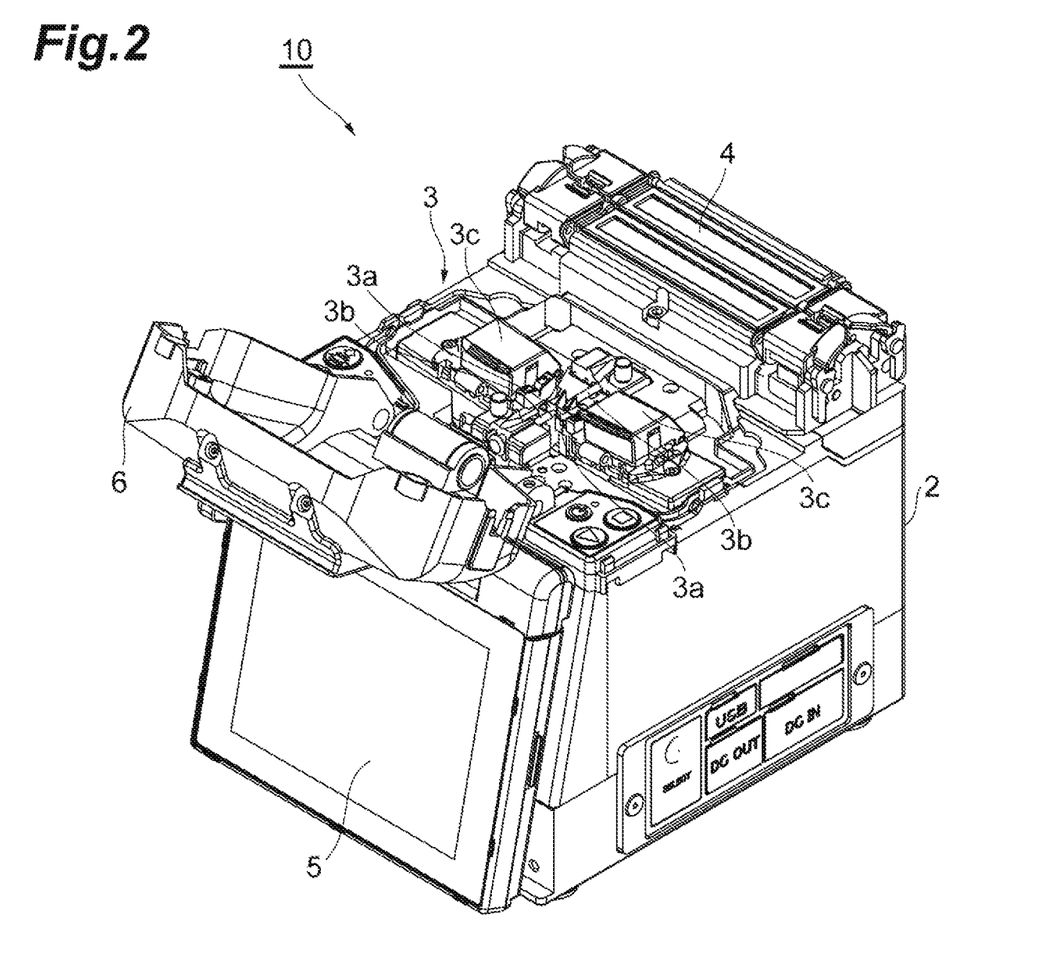
FIG. 2 is a perspective view illustrating an internal structure of the fusion splicer illustrated in FIG. 1.

First, a fusion splicer 10 in which malfunctions are monitored for by a management system according to an embodiment is described below with reference to FIGS. 1 and 2. FIGS. 1 and 2 are perspective views illustrating an appearance of a fusion splicer, where FIG. 1 illustrates the appearance of the fusion splicer in a state in which a windproof cover is closed and FIG. 2 illustrates the appearance of the fusion splicer in a state in which the windproof cover is open such that an internal structure thereof is visible. The fusion splicer 10 is a device that fuses and splices optical fibers to each other and includes a box-shaped housing 2 as illustrated in FIGS. 1 and 2. A fusion splicing mechanism 3 that fuses and splices optical fibers to each other and a heater 4 that heats and shrinks a fiber reinforcement sleeve with which fusion splicing portions of the optical fibers fused by the fusion splicing mechanism 3 are covered are provided in an upper part of the housing 2. The fusion splicer 10 includes a monitor 5 that displays a fusion splicing state between optical fibers which is imaged by a microscopic camera (not illustrated) disposed in the housing 2. The fusion splicer 10 includes a windproof cover 6 that prevents entrance of wind into the fusion splicing mechanism 3.

The fusion splicing mechanism 3 includes a pair of fiber positioning portions 3a, a pair of discharge electrodes 3b, and a holder mount on which a pair of optical fiber holders 3c can be placed. Optical fibers which are fused are held and fixed by the optical fiber holders 3c, and the optical fiber holders 3c are placed and fixed on the holder mount. The fiber positioning portions 3a are disposed between the optical fiber holders 3c and positions the tips of the optical fibers held by the optical fiber holders 3c. The discharge electrodes 3b are electrodes which are disposed between the fiber positioning portions 3a and which are used to fuse the tips of the optical fibers by arc discharge. In the fusion splicer 10, a failure of a microscope (non-operation or attachment of contaminants), a failure of the discharge electrodes 3b and an electrode mount, a failure of a stage, a failure of the heater 4, a failure of a V-groove for placing an optical fiber, and the like can occur during continuous use thereof.

Figure 3:
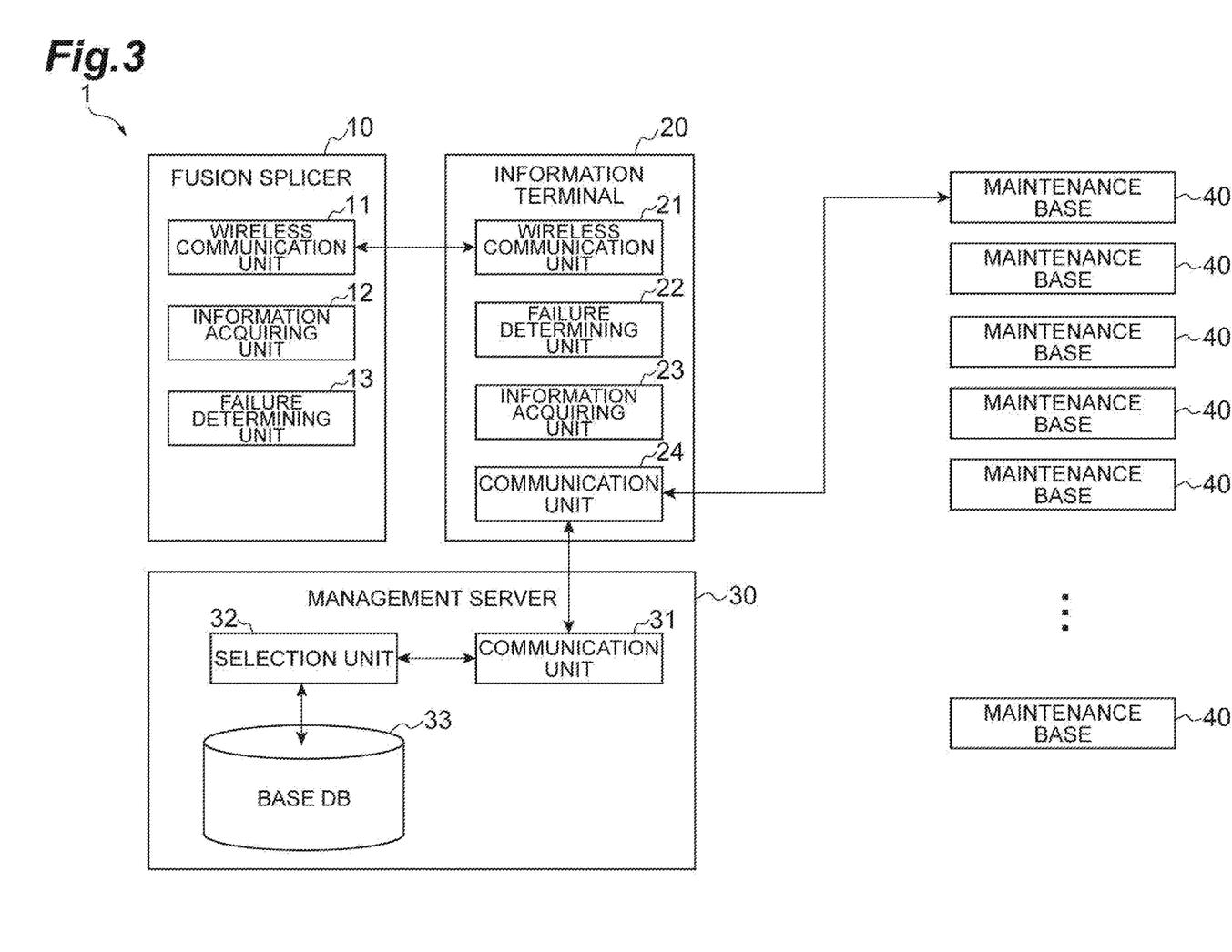
FIG. 3 is a block diagram schematically illustrating a management system of a fusion splicer according to an aspect of the present disclosure.

Then, the configuration of the management system 1 that performs a selection process of detecting a failure and selecting an appropriate maintenance base depending on the detected failure mode when the failure occurs in constituent instruments of the fusion splicer 10 is described below with reference to FIG. 3. FIG. 3 is a block diagram schematically illustrating a management system of a fusion splicer according to an aspect. As illustrated in FIG. 3, the management system 1 includes a fusion splicer 10, an information terminal 20, and a management server 30. The information terminal 20 is configured to perform wireless communication with the fusion splicer 10 in a band of 2.4 GHz based on, for example, IEEE 802.11. The information terminal 20 is connected to the management server 30 by an electric communication network (partially including a wireless network) and is configured to transmit and receive various types of information thereto and therefrom.

Figure 4:
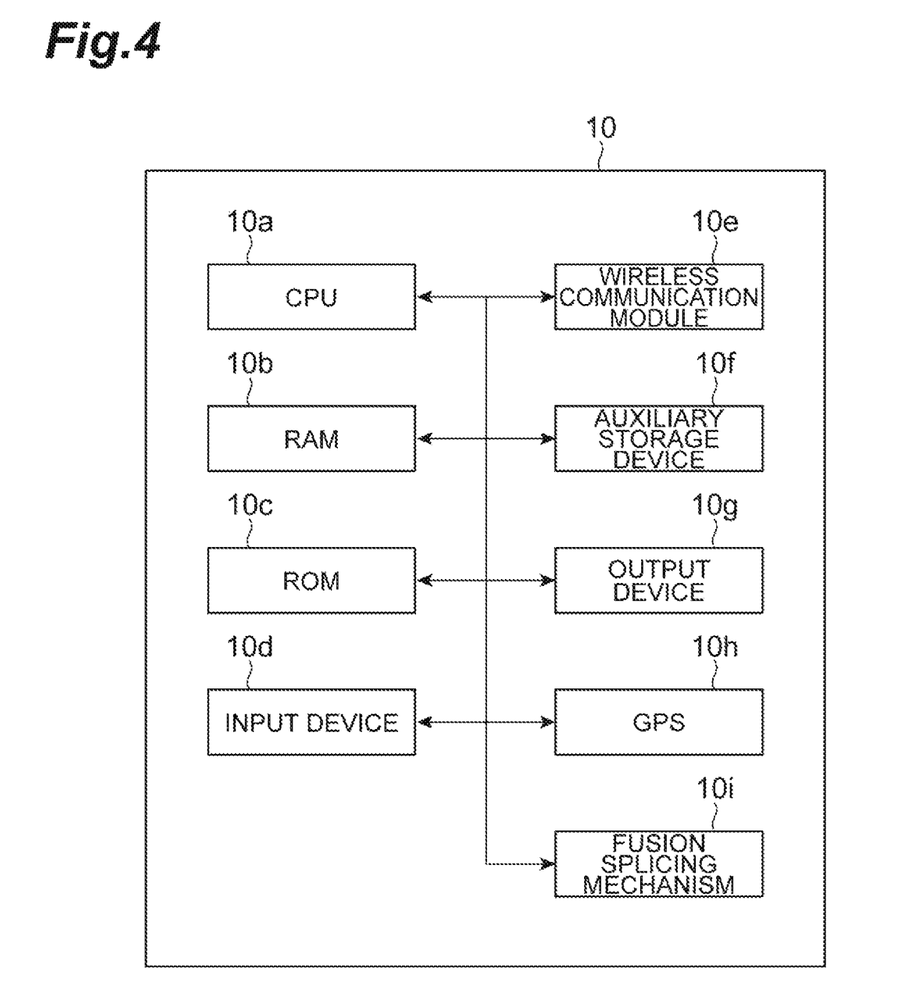
FIG. 4 is a block diagram illustrating a hardware configuration of a fusion splicer illustrated in FIG. 3.

The fusion splicer 10 functionally includes a wireless communication unit 11 that wirelessly communicates externally such as to the information terminal 20, an information acquiring unit 12 that acquires various types of information such as whether a constituent instrument in the fusion splicer 10 malfunctions, and a failure determining unit 13 that determines whether a constituent instrument in the fusion splicer 10 has malfunctioned. As illustrated in FIG. 4, the fusion splicer 10 is configured to include a computer including control and communication hardware such as a CPU 10a, a RAM 10b, a ROM 10c, an input device 10d, a wireless communication module 10e, an auxiliary storage device 10f, and an output device 10g. The functions (details of which are describe later) of the fusion splicer 10 are realized by operating these elements in accordance with a program or the like. The fusion splicer 10 may include a device that acquires position information such as a GPS 10h and may be configured to acquire position information of the fusion splicer 10 such as a longitude and latitude using the GPS 10h. The fusion splicer 10 includes various fusion splicing mechanisms 10i (e.g. the discharge electrodes 3b) in addition to the control function and the communication function.

The wireless communication unit 11 performs wireless communication with the information terminal 20 (a wireless communication unit 21). The wireless communication unit 11 includes, for example, a wireless LAN card and performs wireless communication with the information terminal 20 in the band of 2.4 GHz based on IEEE 802.11. An SSID (an identifier) of a wireless access point (a wireless AP) specific to the fusion splicer 10 is wirelessly transmitted from the wireless communication unit 11 to the wireless communication unit 21, the SSID is recognized by the information terminal 20, and wireless connection between the wireless communication unit 11 and the wireless communication unit 21 is set up. An example of the SSID is "T71C_420000001," and an SSID which is different from SSIDs given to other fusion splicers 10 that can wirelessly communicate therewith is given such that the fusion splicers 10 can be identified. Wireless communication in the wireless communication unit 11 is not limited to the above-mentioned communication standard and another communication standard may be employed.

The information acquiring unit 12 acquires operation information (measured values) in the constituent instruments of the fusion splicer 10. The information acquiring unit 12 acquires at least one piece of operation information out of luminance information when an amount of light in the microscope is the maximum, focus position information when the microscope is focused, and information on luminance waveforms (appearance of an optical fiber) acquired from the microscope of the fusion splicer 10. The information acquiring unit 12 acquires operation information of the electrode mount of the fusion splicer 10 such as whether the discharge electrodes perform discharging from a monitor image at the time of discharge. The information acquiring unit 12 acquires operation information of the stage (the V-grooves or the like) of the fusion splicer 10 such as whether the stage is operating at the time of fusion or whether the operation is appropriate from detection by a built-in sensor or the like or monitor information of the optical fibers at the time of fusion. The information acquiring unit 12 acquires temperature information of the heater 4 of the fusion splicer 10 from a temperature sensor disposed in the vicinity of the heater 4 as operation information of the heater 4. The information acquiring unit 12 passes a part or all of the acquired operation information to the failure determining unit 13. The information acquiring unit 12 may transmit a part or all of the above-mentioned operation information to a failure determining unit 22 of the information terminal 20 by wireless communication between the wireless communication units 11 and 12. The information acquiring unit 12 is configured to acquire both the operation information when a fusion operation is actually performed and the operation information which can be acquired without actually performing the fusion operation (which has been already acquired).

The failure determining unit 13 determines the occurrence of a failure or the failure position (a constituent instrument which is out of order) of the fusion splicer 10 on the basis of the operation information of the constituent instruments of the fusion splicer 10 acquired by the information acquiring unit 12 and generates information on a type of a failure mode. Regarding the microscope of the fusion splicer 10, the failure determining unit 13 compares a luminance (a measured value) when the amount of light in the microscope is maximized with a preset reference value, and determines that the microscope has malfunctioned when the luminance is less than the reference value. An example of a failure of the microscope in this determination is a case in which a light source of the microscope malfunctions. An example also includes a case in which contaminants are simply attached to the surface of the microscope. In this case, contaminants are removed from the surface of the microscope and then determination is performed again. The failure determining unit 13 may determine that the microscope has malfunctioned when the focus position of the microscope is closer than the reference value (a designed value, a factory default value, or the like) according to a result of determination of a failure of the microscope of the fusion splicer 10. Examples of a failure of the microscope in this determination include a case in which an optical fiber melted at the time of discharging to the optical fiber is attached to the microscope and a case in which the light source malfunctions. In determination of a failure of the microscope, the failure determining unit 13 compares the luminance waveforms (appearance of an optical fiber) with preset reference waveforms and determines that the microscope has malfunctioned when the luminance waveforms collapse or a luminance peak is low. An example of a failure of the microscope in this determination is a case in which a light source or an optical system of the microscope malfunctions.

The failure determining unit 13 determines that the electrode mount (or the discharge electrodes) has malfunctioned when the electrode mount of the fusion splicer 10 does not emit light at the time of discharging on the basis of image information on whether the discharge electrodes is performing discharging, or the like. Regarding the stage of the fusion splicer 10, the failure determining unit 13 determines that the stage, a motor moving the stage, or the like has malfunctioned on the basis of operation information (sensor information or image information) such as whether the stage is operating or whether an operation thereof is appropriate. For example, when an optical fiber which is placed on the stage is not included in the image information, the failure determining unit 13 can determine that the stage of the fusion splicer 10 or the like has malfunctioned. Regarding the heater 4 of the fusion splicer 10, the failure determining unit 13 can determine that the heater 4 has malfunctioned when an increase in temperature cannot be detected from the detected temperature on the basis of information on the detected heating temperature of the heater 4.

When one of the above-mentioned failures is detected, the failure determining unit 13 transmits specific information (a failure mode) of a constituent instrument which is out of order to the information terminal 20 via the wireless communication unit 11. The failure determining unit 13 may perform determination of some or all of the above-mentioned failures or may perform failure determination in cooperation with the failure determining unit 22 of the information terminal 20 which is described later, or a configuration in which the failure determination is performed by the failure determining unit 22 of the information terminal 20 and is not performed by the fusion splicer 10 may be employed. Acquisition of the operation information of the constituent instruments of the fusion splicer 10 and detection of a failure based on the operation information may be periodically performed while the fusion splicer 10 is operating, or failure detection modes or the like may be provided and the failure detection may be performed when an input instruction for a failure detection mode is received. When a failure is detected, the failure determining unit 13 may display specific information of a constituent instrument which is out of order on the monitor 5 to inform an operator.

Figure 5:
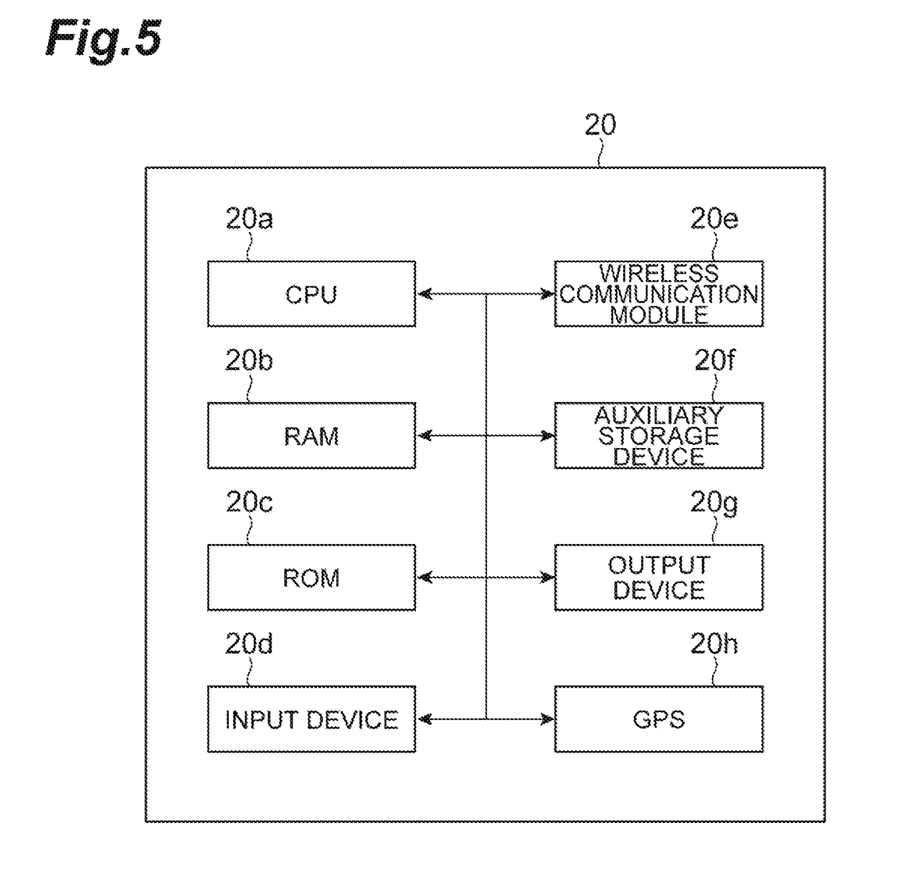
FIG. 5 is a block diagram illustrating a hardware configuration of an information terminal illustrated in FIG. 3.
Figure 6:
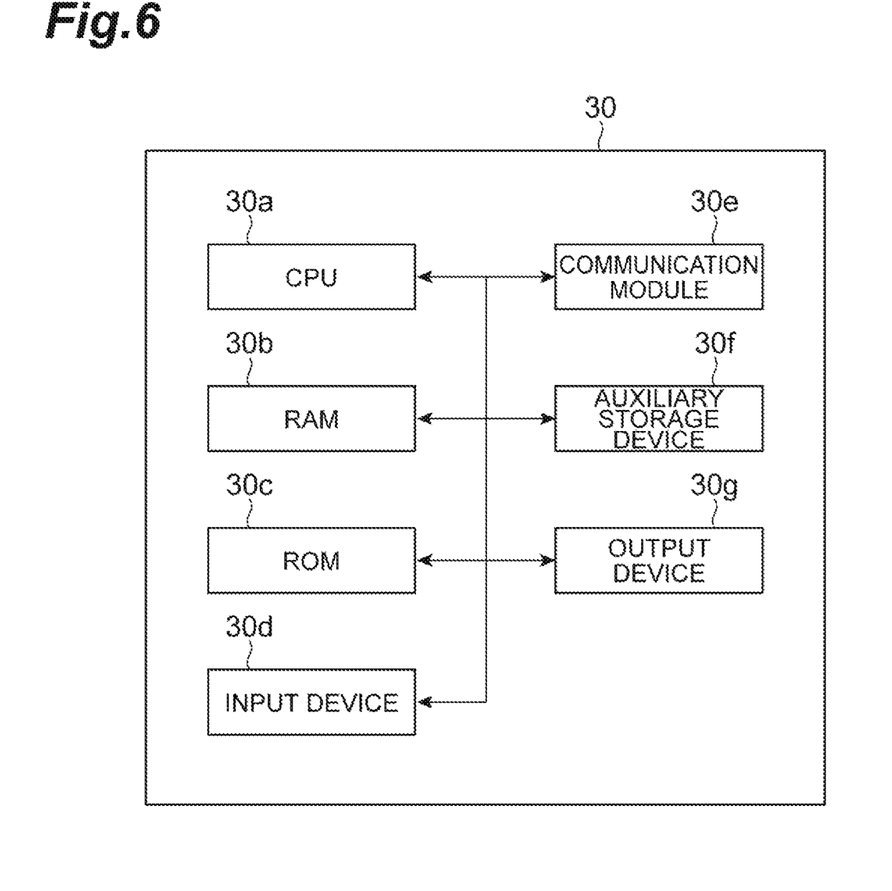
FIG. 6 is a block diagram illustrating a hardware configuration of a management server illustrated in FIG. 3.

The information terminal 20 that acquires the operation information of the constituent instruments or information of a constituent instrument which is out of order from the fusion splicer 10 having the above-mentioned functions is constituted, for example, by a portable wireless communication terminal such as a smartphone or an information terminal such as a personal computer (PC) having a wireless communication function. The information terminal 20 includes a wireless communication unit 21, a failure determining unit 22, an information acquiring unit 23, and a communication unit 24 (a notification unit). As illustrated in FIG. 5, the information terminal 20 is configured to include a computer including hardware such as a CPU 20a, a RAM 20b, a ROM 20c, an input device 20d, a wireless communication module 20e, an auxiliary storage device 20f, an output device 20g, and a GPS 20h. The functions of the information terminal 20 which is described later are realized by operating these elements in accordance with a program or the like. The management server 30 may be constituted by a hardware configuration as illustrated in FIG. 6.

The wireless communication unit 21 is constituted by, for example, the wireless communication module 20e and performs transmission and reception of various types of wireless signals to and from the wireless communication unit 11 of the fusion splicer 10 by wireless communication. The wireless communication unit 21 is constituted by, for example, a wireless LAN module which is incorporated into a terminal and performs, for example, communication in the band of 2.4 GHz based on IEEE 802.11 to correspond to the wireless standard of the wireless communication unit 11. The wireless communication unit 21 sets up wireless communication with the wireless communication unit 11 by receiving SSIDs (identifiers) individually given to the fusion splicers by a wireless signal from the fusion splicer 10 and performing authentication for the SSIDs. The wireless communication unit 21 acquires the operation information of the constituent instruments acquired by the information acquiring unit 12 of the fusion splicer 10 or information on the result of failure determination (the type of a failure mode) in the failure determining unit 13 via the wireless communication unit 11.

The failure determining unit 22 determines at least one of whether the fusion splicer 10 has a failure and a failure position (a constituent instrument which is out of order) on the basis of the operation information of the constituent instruments of the fusion splicer 10 which is acquired by the information acquiring unit 12 and received via the wireless communication units 11 and 21, and generates information of a failure mode. A failure determining process performed by the failure determining unit 22 is the same as the process performed by the failure determining unit 13 of the fusion splicer 10 and thus description thereof will be omitted. The failure determining unit 22 passes information such as the acquired type of a failure mode to a communication unit 24.

The information acquiring unit 23 acquires position information of the information terminal 20 using a GPS device or the like. In the management system 1, since the information terminal 20 is disposed in the vicinity of the fusion splicer 10 and the position of the information terminal 20 and the position of the fusion splicer 10 can be equated, the information acquiring unit 23 acquires the position information of the information terminal 20 as the position information of the fusion splicer 10. In the management system 1, a GPS device may be provided in the fusion splicer 10 and the position information of the fusion splicer 10 may be directly acquired. The information acquiring unit 23 passes the acquired position information to the communication unit 24.

Figure 7:
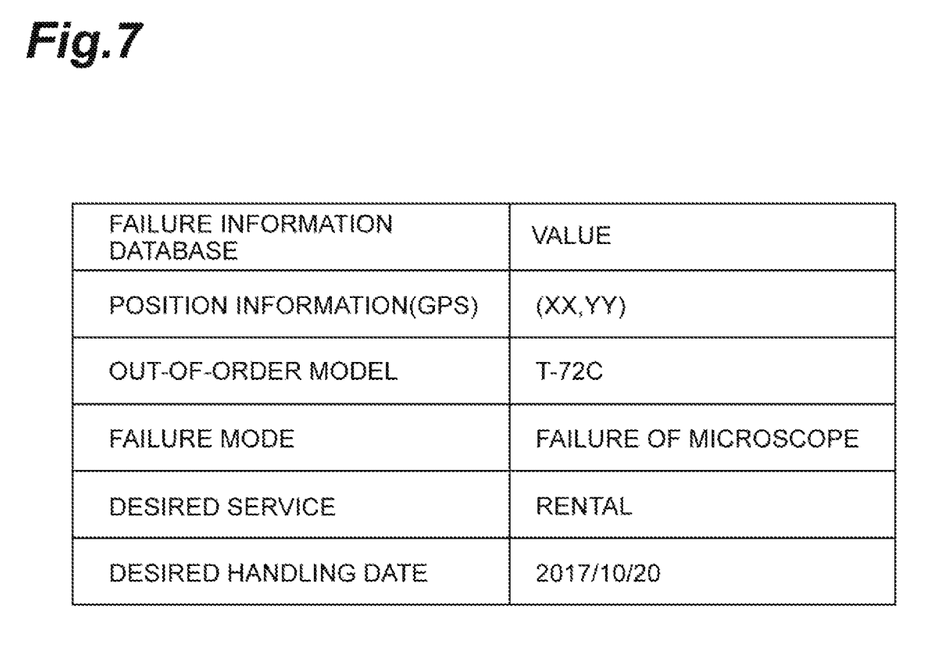
FIG. 7 is a diagram illustrating an example of failure information database of an out-of-order fusion splicer.

The communication unit 24 performs transmission and reception of information to and from the management server 30 (the communication unit 31) via an electric communication network (partially including a wireless network). When it is detected that a failure has occurred in the fusion splicer 10 by acquiring a failure mode, the communication unit 24 prepares information of an individual failure information database, for example, as illustrated in FIG. 7, transmits the prepared information to the management server 30, and requests the management server 30 to perform a process of retrieving information of an appropriate maintenance base that can handle the failure. In the example illustrated in FIG. 7, data in which position information of the out-of-order fusion splicer 10 (or position information of the information terminal 20), information of an out-of-order model (e.g. T-72C), and information of a failure mode (e.g. a microscope failure) are correlated, and information on whether rental of another fusion splicer capable during handling the failure is desired or a desired delivery time of maintenance repaired failed fusion splicer are further correlated thereto. When information of a maintenance base capable of handling the failure of the out-of-order fusion splicer 10 is received from the management server 30, the communication unit 24 displays the base information (such as a name and contact information of the base) on the monitor of the information terminal 20 or the like. The communication unit 24 is configured to take charge of a function such as notification to or communication with each maintenance base 40.

As illustrated in FIG. 3, the management server 30 that receives information of individual failure information databases (see FIG. 7) and a retrieval request of an appropriate maintenance base from the information terminal 20 includes a communication unit 31, a selection unit 32, and a base DB 33. The communication unit 31 corresponds to the communication unit 24 and performs transmission and reception of information to and from the communication unit 24 of the information terminal 20 via an electric communication network (partially including a wireless network).

Figure 8:
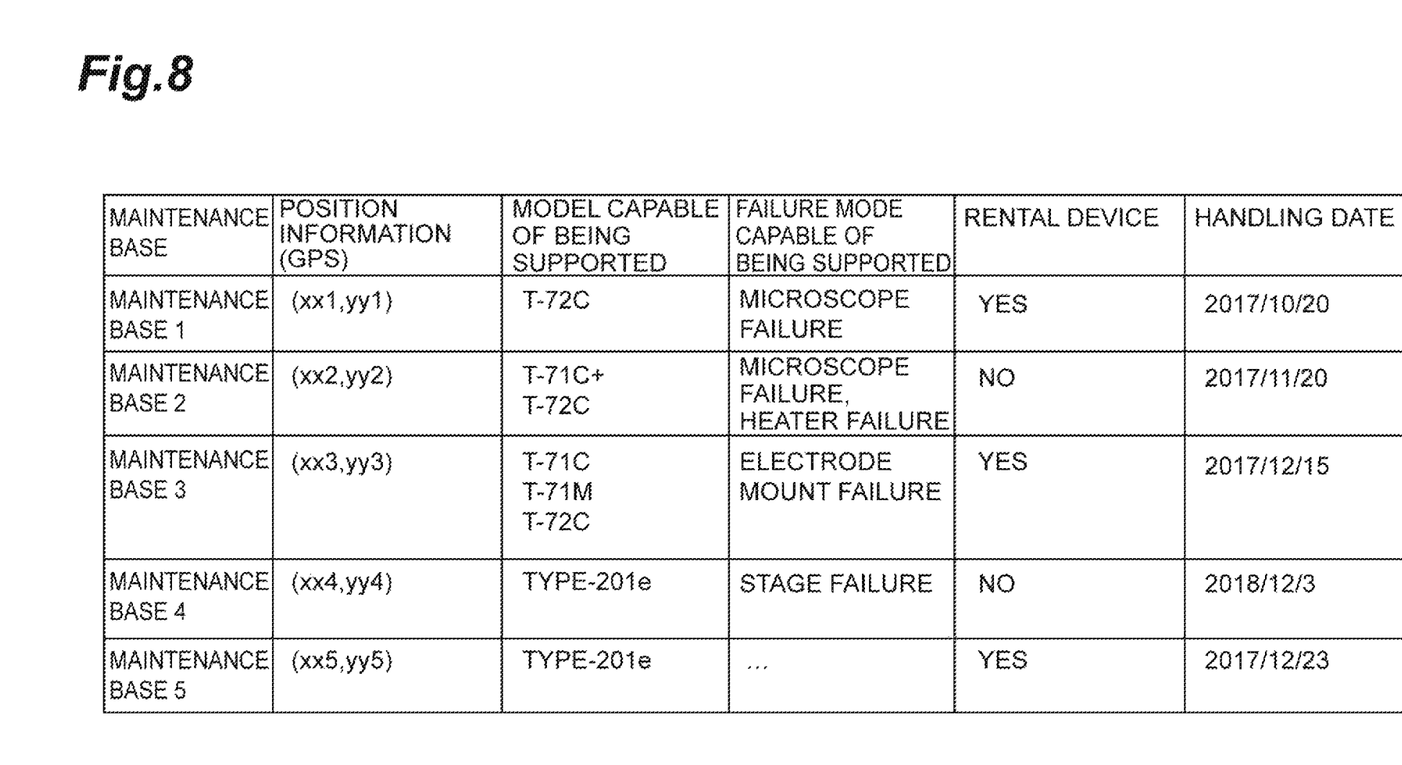
FIG. 8 is a diagram illustrating an example of a database in which failure modes which are able to be supported by respective maintenance bases stored in the management server and the like are collected.

The selection unit 32 selects an appropriate maintenance base on the basis of the type of the failure mode determined by the failure determining unit 13 or the failure determining unit 22 and the position information of the fusion splicer 10 acquired by the information acquiring unit 23. When the information of individual failure information databases (see FIG. 7) and the retrieval request of an appropriate maintenance base are received from the information terminal 20 via the communication units 24 and 31, the selection unit 32 compares this information with the base DB 33, selects a maintenance base optimal for the fusion splicer 10, and returns the information to the information terminal 20. The number of maintenance bases selected by the selection unit 32 may be one or two or more. The base DB 33 which is used for selection by the selection unit 32 includes information in which position information (latitude and longitude) of maintenance bases (maintenance bases 1 to 5), information of models which can be supported (e.g. T-72c or TYPE-201e), information of failure modes which can be supported (e.g. a microscope failure or an electrode mount failure), whether there is a rental unit, and dates on which a failure can be handled are correlated with each other, for example, as illustrated in FIG. 8. In FIG. 8, for example, five maintenance bases are illustrated and the base DB 33 may be a database including 100 or more maintenance bases.

A process of the fusion splicer 10 including the failure information database illustrated in FIG. 7 is described below as a base selecting process performed by the selection unit 32. The selection unit 32 first performs a process of excluding a maintenance base 5 which is farthest from the out-of-order fusion splicer 10 and narrowing the maintenance base candidates to the maintenance bases 1 to 4 using the position information (GPS) of the fusion splicer 10 (or the information terminal 20). Then, the selection unit 32 performs a process of comparing the model of the out-of-order fusion splicer 10 with information of models which are handled by the maintenance bases 1 to 4 and selecting the maintenance bases 1 to 3 supporting a model T-72C. Then, the selection unit 32 performs a process of comparing the failure mode of the out-of-order fusion splicer 10 with the failure modes which can be handled by the maintenance bases 1 to 3 and selecting the maintenance bases 1 and 2 which can support the microscope failure. Finally, the selection unit 32 performs a process of selecting the maintenance base 1 matching information on whether rental is desired or a desired delivery time. The above-mentioned selection method is only an example and narrowing of the bases or the number of narrowed bases can be appropriately adjusted. For example, the process of excluding the farthest base is performed at the time of selection using the position information of the fusion splicer 10, but may perform, for example, a selection process of narrowing the candidates for a maintenance base to a range with a radius of 30 km from the fusion splicer 10.

Figure 9:
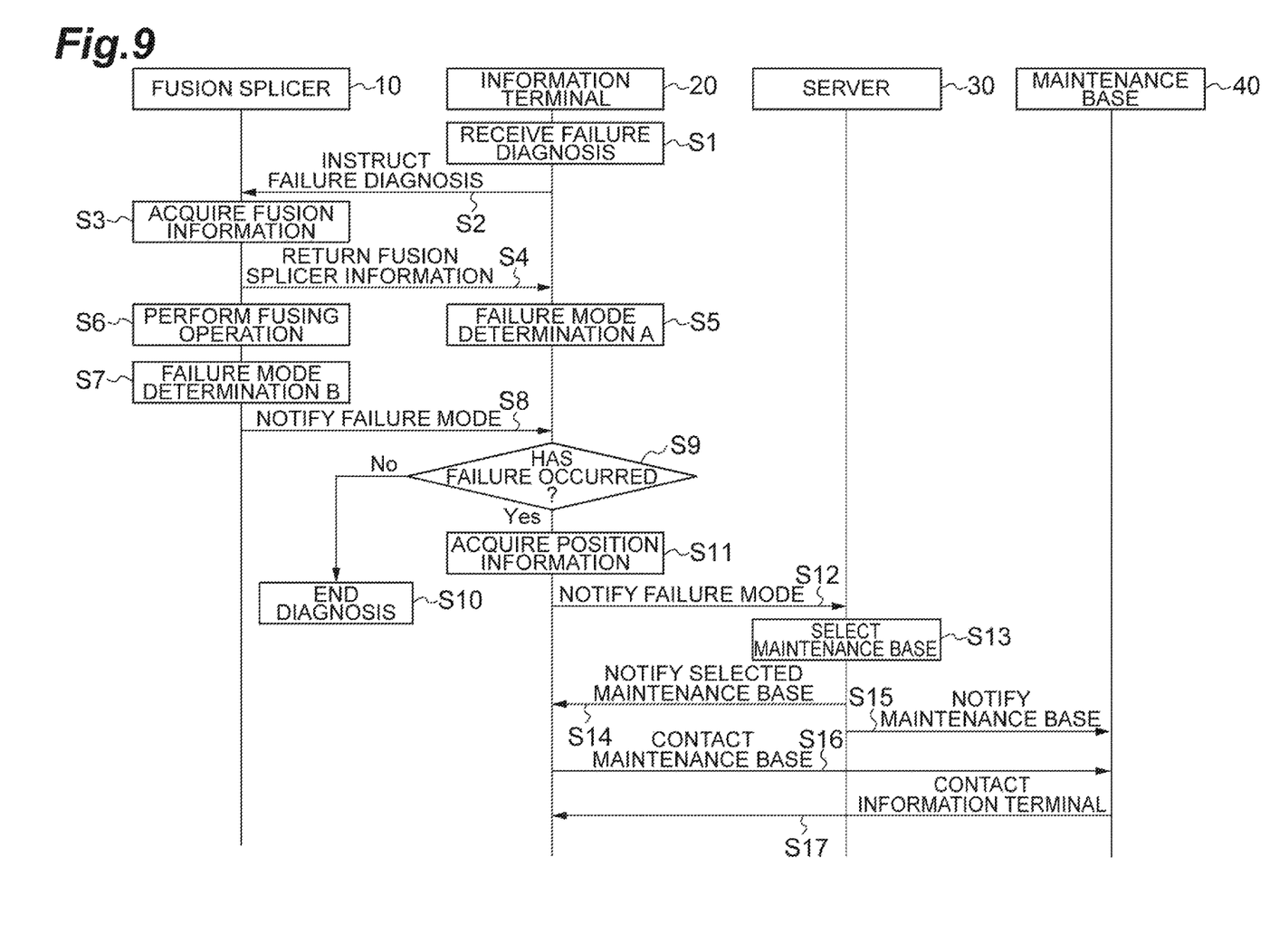
FIG. 9 is a sequence diagram illustrating a process flow of retrieving a maintenance base to which repair of an out-of-order fusion splicer can be requested by the management system illustrated in FIG. 3.

A method of retrieving a maintenance base that can handle a failure of the fusion splicer 10, which is performed by the management system 1, is described below with reference to FIG. 9. FIG. 9 is a sequence diagram illustrating a process flow of retrieving a maintenance base which can be requested to repair an out-of-order fusion splicer, which is performed by the management system 1.

As illustrated in FIG. 9, first, the information terminal 20 acquires information of an input of receiving failure diagnosis of a fusion splicer 10 (Step S1). Step S1 can be skipped when the management system 1 periodically performs a process of detecting a failure of the fusion splicer 10.

Subsequently, when failure diagnosis is received, an instruction signal for failure diagnosis is wirelessly transmitted from the information terminal 20 to the fusion splicer 10 (Step S2), and the fusion splicer 10 acquires operation information (fusion information) of the constituent instruments of the fusion splicer 10 (Step S3). As described above, for example, the operation information is operation information of instruments which are used to fuse fibers such as the microscope, the electrode mount, the stage, and the heater of the fusion splicer 10. The fusion splicer 10 having acquired the operation information wirelessly transmits the acquired operation information of the fusion splicer 10 to the information terminal 20 (Step S4).

Subsequently, the information terminal 20 having acquired the operation information of the fusion splicer 10 determines whether there is a failure of the fusion splicer 10 or which constituent instrument has malfunctioned on the basis of the acquired operation information (Step S5: failure mode determination A). Here, the failure determination is failure determination performed by the failure determining unit 22 (the failure determining unit 13) and detailed description thereof is not repeated. On the other hand, when the failure determination is performed in the fusion splicer 10, an actual fusing operation is performed (Step S6), the operation information when the fusing operation is specifically performed is acquired, and whether there is a failure of the fusion splicer 10 or which constituent instrument has malfunctioned may be determined by the fusion splicer 10 on the basis of the operation information (Step S7: failure mode determination B). When the fusion splicer 10 performs the failure mode determination B, the fusion splicer 10 outputs the result of determination to the information terminal 20. The failure determination is failure determination in the failure determining unit 13 and detailed description thereof is not repeated. In the failure mode determination, both the failure mode determination A in the information terminal 20 and the failure mode determination B in the fusion splicer 10 may be performed, or which of the failure mode determination in the fusion splicer 10 and the failure mode determination in the information terminal 20 is to be performed may be determined depending on the process details of the failure mode determination.

Subsequently, when the failure mode determination A of Step S5 (or the failure mode determination B of Step S7) ends, the information terminal 20 determines whether a failure occurs in the fusion splicer 10 which is to be determined (Step S9). When it is determined in Step S9 that no failure occurs in the fusion splicer 10 which is to be determined, the process flow ends (Step S10). On the other hand, when it is determined in Step S9 that a failure occurs in the fusion splicer 10 which is to be determined, position information of the information terminal 20 is acquired as position information of the fusion splicer 10 which is disposed in the vicinity thereof (Step S11).

Subsequently, when it is determined that a failure occurs in the fusion splicer 10, the failure information database (see FIG. 7) in which position information, a model, a failure mode, a desired service, a desired handling date, and the like of the fusion splicer 10 are arranged is transmitted to the management server 30 (Step S12). The management server 30 having received the failure information database compares the acquired failure information database with the base database (see FIG. 8) stored in the base DB 33 and selects a base which is close to the location of the fusion splicer 10, can handle the malfunctioning model or the failure mode, and matches a desired service (rental of a substitute), a desired repair delivery time, and the like through the process of comparing the data (Step S13). In Step S13, one base may be selected or a plurality of bases may be selected. The management server 30 transmits candidate data of the selected maintenance base to the information terminal 20 (Step S14). The management server 30 may inform the selected maintenance base of a notification of selection as an advance notice (Step S15).

Subsequently, the information terminal 20 having received candidate data for a maintenance base matching a condition from the management server 30 displays the acquired candidate data of a maintenance base on the monitor of the information terminal 20 or the like to notify an operator or a manager. The information terminal 20 may link contact information of the maintenance base to candidate data of the maintenance base displayed on the monitor or the like and inform of a repair request using an e-mail or the like in response to an input from an operator (Step S16). The maintenance base 40 communicates with the information terminal 20 in response to the repair request from the information terminal 20 (Step S17). Instead of electronic contact in Steps S16 and S17, an operator or a manager may directly contact the selected maintenance base by a phone and request repair.

With the management system 1 of the fusion splicer 10 and the management method by the management system according to the embodiment described above, the type of a failure mode of the fusion splicer 10 is determined, position information of the fusion splicer 10 is acquired, and an appropriate maintenance base is selected on the basis of the type of the failure mode and the position information of the fusion splicer 10. In this case, with the management system 1 or the management method, since a maintenance base which can handle the failure mode occurring in the fusion splicer 10 and which is close thereto can be selected, it is possible to easily retrieve a maintenance base that can repair the out-of-order fusion splicer 10.

The management system 1 of a fusion splicer 10 further includes the base DB33 that includes data of position information of a plurality of maintenance bases and failure modes which are able to be repaired by the respective maintenance bases. The selection unit 32 selects the appropriate maintenance base by comparing the acquired type of the failure mode and the acquired position information of the fusion splicer 10 with the base DB 33. In this way, since an appropriate maintenance base is selected using the base database in which necessary base information is stored in advance, it is possible to more easily retrieve a maintenance base that can repair the out-of-order fusion splicer 10.

In the management system 1 of a fusion splicer 10, the selection unit 32 selects the appropriate maintenance base on the basis also of model information of the fusion splicer 10. Accordingly, since the model information is additionally used for the process of selecting an appropriate maintenance base, it is possible to more easily retrieve a more appropriate maintenance base that can repair the out-of-order fusion splicer.

The management system 1 of a fusion splicer 10 notifies the selection unit 32 of information on whether rental of another fusion splicer corresponding to the out-of-order fusion splicer 10 is desired and a desired delivery time of a repaired failed fusion splicer 10. The selection unit 32 selects the appropriate maintenance base on the basis also of both the information on whether rental is desired and the desired delivery time. Accordingly, since the information on whether rental of a fusion splicer 10 is desired and the desired delivery time of a failure repair is additionally used for the process of selecting an appropriate maintenance base, it is possible to easily retrieve an appropriate (more desired) maintenance base that can repair the out-of-order fusion splicer 10. The selection unit 32 may not use this information to select a maintenance base.

In the management system 1 of a fusion splicer 10, the type of the failure mode of the fusion splicer 10 may include at least one piece of information of a failure of the microscope of the fusion splicer 10, a failure of the electrode mount of the fusion splicer 10, a failure of the stage of the fusion splicer 10, a failure of the heater 4 of the fusion splicer 10, and a failure of the V-groove for placing an optical fiber in the fusion splicer 10. Accordingly, it is possible to easily retrieve an appropriate maintenance base that can repair the out-of-order fusion splicer 10.

While the management system and the management method for retrieving an optimal maintenance base when a fusion splicer has malfunctioned according to an embodiment of the present disclosure have been described above, the management system and the management method according to the present invention are not limited to the embodiments and can be modified in various forms. For example, in the above embodiment, position information of the information terminal 20 is used to acquire position information of the fusion splicer 10, but a GPS may be installed in the fusion splicer 10, position information of the fusion splicer 10 may be directly acquired, and an appropriate base may be retrieved using the acquired position information.

REFERENCE SIGNS LIST

1 . . . Management system
10 . . . Fusion splicer
11 . . . Wireless communication unit
12 . . . Information acquiring unit
13 . . . Failure determining unit
20 . . . Information terminal
21 . . . Wireless communication unit
22 . . . Failure determining unit
23 . . . Information acquiring unit
24 . . . Communication unit
30 . . . Management server
31 . . . Communication unit
32 . . . Selection unit
33 . . . Base DB
40 . . . Maintenance base

The invention claimed is:

1. A management system for fusion splicer malfunction, the management system comprising:
a fusion splicer to generate operation information in response to a splicing of optical fibers;
one or more processors configured to:
acquire the operation information generated by the fusion splicer, the operation information including:
a measured luminance when an amount of light in a microscope of the fusion splicer is at maximum,
a focus position when the microscope is focused, and
a luminance waveform acquired from the microscope,
determine a type of a failure mode of a fusion splicer based on the acquired operation information such that the determined type of the failure mode is one failure type selected from the group consisting of:

a first type failure with the microscope, which is determined by comparing the measured luminance to a first preset reference value, a second type failure with the microscope, which is determined by comparing the focus position to a second preset reference value, a third type failure with the microscope, which is determined by comparing the luminance waveform to a preset reference waveform, a failure with an electrode mount in the microscope, which is determined when image information indicates that discharge electrodes of the microscope do not emit light at the time of discharging, a failure with a stage of the fusion splicer, which is determined based on sensor information, a failure of a heater of the fusion splicer, which is determined when an increase in temperature is not detected, and a failure of a V-groove for placing an optical fiber in the fusion splicer, which is determined based on sensor or image information acquired at the time of fusion;

acquire position information of the fusion splicer; and identify a maintenance base selected among a plurality of maintenance bases, based on the determined type of the failure mode and the acquired position information of the fusion splicer; and a display device in communication with the one or more processors, to display the identified maintenance base.

2. The management system according to claim 1, further comprising a storage configured to store a base database that includes data of position information of the plurality of maintenance bases and failure modes to be repaired by the maintenance bases, wherein the maintenance base is selected by comparing the type of the failure mode and the position information of the fusion splicer with the base database.

3. The management system according to claim 1, wherein the one or more processors are configured to acquire model information of the fusion splicer, wherein the maintenance base is selected further based on the model information.

4. The management system according to claim 1, wherein the one or more processors are configured to acquire rental information including information on whether another fusion splicer is to replace the fusion splicer during repair and a requested delivery time of the fusion splicer after the fusion splicer has been repaired, and wherein the maintenance base is selected further based on the rental information.

5. The management system according to claim 1, further comprising:

the fusion splicer, wherein the fusion splicer is configured to perform a splicing of optical fibers, and to generate the operation information in response to the splicing; and an information terminal that includes the display device and a processor among the one or more processors to determine the type of the failure mode, wherein the information terminal is configured to communicate with the fusion splicer to acquire the operation information.

6. The management system according to claim 5, wherein the information terminal includes a user input device configured to receive a failure diagnosis instruction, and wherein the processor of the information terminal is configured to acquire the operation information in response to the failure diagnosis instruction.

7. The management system according to claim 5, further comprising a server that includes a processor among the one or more processors, wherein the maintenance base is selected by the processor of the server, and wherein the server is in communication with the information terminal via a communication network, to send the selected maintenance base to be displayed.

8. A management method for fusion splicer malfunction, the management method comprising:

generating, by the fusion splicer operation information in response to a splicing of the optical fibers;

acquiring the operation information generated by the fusion splicer, the operation information including:

a measured luminance when an amount of light in a microscope of the fusion splicer is at maximum, a focus position when the microscope is focused, and a luminance waveform acquired from the microscope, determining a type of a failure mode of a fusion splicer based on the acquired operation information such that the determined type of the failure mode is one failure type selected from the group consisting of:

a first type failure with the microscope, which is determined by comparing the measured luminance to a first preset reference value, a second type failure with the microscope, which is determined by comparing the focus position to a second preset reference value, a third type failure with the microscope, which is determined by comparing the luminance waveform to a preset reference waveform, a failure with an electrode mount in the microscope, which is determined when image information indicates that discharge electrodes of the microscope do not emit light at the time of discharging, a failure with a stage of the fusion splicer, which is determined based on sensor information, a failure of a heater of the fusion splicer, which is determined when an increase in temperature is not detected, and a failure of a V-groove for placing an optical fiber in the fusion splicer, which is determined based on sensor or image information acquired at the time of fusion;

acquiring position information of the fusion splicer;

identifying a selected maintenance base, based on the determined type of the failure mode and the acquired position information of the fusion splicer; and displaying the identified maintenance base on a display device.

9. The management method according to claim 8, wherein the identified maintenance base is selected by comparing the determined type of the failure mode and the acquired position information of the fusion splicer with a base database that includes data of position information of a plurality of maintenance bases and failure modes to be repaired by the maintenance bases.

10. The management method according to claim 8, wherein the identified maintenance base is selected further based on model information of the fusion splicer.

11. The management method according to claim 8, wherein the identified maintenance base is selected further based on rental information including information on another fusion splicer is to replace the fusion splicer during repair and a requested delivery time of the fusion splicer after the fusion splicer has been repaired.

12. The management method according to claim 8, further comprising:
generating the operation information in response to a splicing of optical fibers by the fusion splicer; and
receiving the operation information at an information terminal from the fusion splicer, to determine the type of the failure mode.

13. The management method according to claim 12, further comprising:
receiving a failure diagnosis instruction via a user input device,
wherein the position information is acquired in response to the failure diagnosis instruction,
wherein the information terminal includes the display device,
wherein the selected maintenance base to be displayed is received at the information terminal via a communication network.

14. The management method according to claim 12, wherein the position information acquired corresponds to position information of the information terminal located in a vicinity of the fusion splicer.

15. A client-server system for fusion splicer malfunction, the client-server system comprising:
a fusion splicer to generate operation information in response to a splicing of optical fibers, the operation information including:
a measured luminance when an amount of light in a microscope of the fusion splicer is at maximum,
a focus position when the microscope is focused, and
a luminance waveform acquired from the microscope;
a client processor configured to determine a type of a failure mode of the fusion splicer based on the operation information such that the determined type of the failure mode is one failure type selected from the group consisting of:
a first type failure with the microscope, which is determined by comparing the measured luminance to a first preset reference value,
a second type failure with the microscope, which is determined by comparing the focus position to a second preset reference value,
a third type failure with the microscope, which is determined by comparing the luminance waveform to a preset reference waveform,
a failure with an electrode mount in the microscope, which is determined when image information indicates that discharge electrodes of the microscope do not emit light at the time of discharging,
a failure with a stage of the fusion splicer, which is determined based on sensor information,
a failure of a heater of the fusion splicer, which is determined when an increase in temperature is not detected, and
a failure of a V-groove for placing an optical fiber in the fusion splicer, which is determined based on sensor or image information acquired at the time of fusion;;
a server that is in communication with the client processor via a communication network, wherein the server is configured to:
receive the type of the failure mode via the communication network; and
identify a maintenance base selected among a plurality of maintenance bases, based on the type of the failure mode and position information associated with the fusion splicer; and
a display device that is in communication with the server to display the identified maintenance base.

16. The client-server system according to claim 15, further comprising
an information terminal that is located in a vicinity of the fusion splicer,
wherein the information terminal includes the client processor and the display device,
wherein the client processor is further configured to:
determine a failure occurrence of the fusion splicer based on the type of the failure mode; and
output position information of the information terminal as the position information associated with the fusion splicer to be sent to the server, in response to determining the failure occurrence.

17. The client-server system according to claim 15, further comprising
an information terminal that is located in a vicinity of the fusion splicer and that includes the display device to display the identified maintenance base received from the server,
wherein the fusion splicer includes the client processor to determine the type of the failure mode,
wherein the fusion splicer is further configured to send the failure mode to the information terminal,
wherein the information terminal includes another client processor that is further configured to:
determine a failure occurrence of the fusion splicer based on the type of the failure mode; and
send position information of the information terminal as the position information associated with the fusion splicer to the server, in response to determining the failure occurrence.

18. The client-server system according to claim 15, further comprising
an information terminal that includes a user input device configured to receive a failure diagnosis instruction,
wherein the client processor is configured to acquire the operation information in response to the failure diagnosis instruction, the operation information being generated in response to the splicing of the optical fibers by the fusion splicer.

* * * * *